United States Patent
Kuehnle et al.

(10) Patent No.: US 11,999,368 B2
(45) Date of Patent: Jun. 4, 2024

(54) SYSTEMS AND METHODS FOR AUTOMATED VEHICLE FLEET MANAGEMENT ACCORDING TO DYNAMIC PEDAGOGICAL BEHAVIOR REINFORCEMENT

(71) Applicant: Bendix Commercial Vehicle Systems LLC, Avon, OH (US)

(72) Inventors: Andreas U. Kuehnle, Villa Park, CA (US); Shaun M. Howard, Irvine, CA (US)

(73) Assignee: Bendix Commercial Vehicle Systems, LLC, Avon, OH (US)

( * ) Notice: Subject to any disclaimer, the term of this patent is extended or adjusted under 35 U.S.C. 154(b) by 246 days.

(21) Appl. No.: 17/706,025

(22) Filed: Mar. 28, 2022

(65) Prior Publication Data
US 2023/0303101 A1    Sep. 28, 2023

(51) Int. Cl.
*B60W 50/08*    (2020.01)
*G06V 20/40*    (2022.01)
(Continued)

(52) U.S. Cl.
CPC ........... *B60W 50/087* (2013.01); *G06V 20/41* (2022.01); *G06V 20/44* (2022.01); *G08G 1/20* (2013.01);
(Continued)

(58) Field of Classification Search
CPC ........... B60W 50/087; B60W 2540/30; G06V 20/41; G06V 20/44; G06V 10/778; G06V 20/56; G08G 1/20; G09B 19/167
See application file for complete search history.

(56) References Cited

U.S. PATENT DOCUMENTS 8,260,515 B2    9/2012   Huang et al.
8,280,560 B2   10/2012   Huang et al.
(Continued)

FOREIGN PATENT DOCUMENTS

CN    110175557 A    8/2019
WO   WO 00/31712 A1   6/2000

OTHER PUBLICATIONS

Jeroen Bijman, "Cluster Driving Behaviour", CGI Nederland, *Tilburg University School of Humanities*, Nov. 2017, 53 total pages.
(Continued)

*Primary Examiner* — Xiao En Mo
(74) *Attorney, Agent, or Firm* — Crowell & Moring LLP (57) ABSTRACT

Vehicle fleet management includes processing event-based data corresponding to detected events to generate event data sets that include: at least video corresponding to the event and data identifying an event-type for the event. One or more pedagogical event pairs are identified, each of which includes a first event data set reflecting a "good" response to an event-type and a second event data set reflecting a "bad" response to the event-type. At least one cluster of drivers having similar occurrence rates for the event-type is identified. One or more training lessons are generated for the cluster based on the event type, which training lessons include at least the video of the first event data set and the video of the second event data set. The training lessons are administered to a driver of the cluster via a computing device. The autonomous control of one or more vehicle systems is instituted based on the administered training lessons.

14 Claims, 5 Drawing Sheets

(51) Int. Cl.
*G08G 1/00* (2006.01)
*G09B 19/16* (2006.01)

(52) U.S. Cl.
CPC ....... *G09B 19/167* (2013.01); *B60W 2540/30* (2013.01)

(56) References Cited

U.S. PATENT DOCUMENTS

| | | | |
|---|---|---|---|
| 8,280,601 | B2 | 10/2012 | Huang et al. |
| 8,314,708 | B2 | 11/2012 | Gunderson et al. |
| 9,922,567 | B2 * | 3/2018 | Molin ............... G08G 1/20 |
| 10,629,088 | B2 | 4/2020 | Naiwala et al. |
| 2010/0019880 | A1 | 1/2010 | Huang et al. |
| 2010/0019964 | A1 | 1/2010 | Huang et al. |
| 2010/0023180 | A1 | 1/2010 | Huang et al. |
| 2010/0023216 | A1 | 1/2010 | Huang et al. |
| 2010/0152950 | A1 | 6/2010 | Chin et al. |
| 2010/0209889 | A1 | 8/2010 | Huang et al. |

OTHER PUBLICATIONS

Alessandro Petraro et al., "Driving Behaviour Clustering for Realistic Traffic Micro-Simulators" *Proceedings 31$^{st}$ European Conference n Modelling*, acquired Nov. 2020, 7 total pages.

Yonggang Liu et al., "Research on Classification and Recognition of Driving Styles Based on Feature Engineering", *National Science Foundation of China*, Vo. 7, Jul. 2019, pp. 89245-89255 (11 total pages).

Z. Constantinescu et al., "Driving Style Analysis Using Data Mining Techniques", *Int. J. of Computers, Communication & Control*, vol. V, 2010, No. 5, pp. 654-663 (10 total pages).

* cited by examiner

… no

SYSTEMS AND METHODS FOR AUTOMATED VEHICLE FLEET MANAGEMENT ACCORDING TO DYNAMIC PEDAGOGICAL BEHAVIOR REINFORCEMENT

FIELD OF THE INVENTION

The invention relates to systems and methods for automated vehicle fleet management according to dynamic pedagogical behavior reinforcement.

BACKGROUND

Fleets of commercial vehicles currently utilize driver/vehicle event monitoring systems to detect events associated with the vehicles and/or their drivers. Those drivers often produce and encounter different types of events at different rates. For some drivers, particularly those who produce/encounter "bad" events at higher rates, remedial training and/or coaching may be helpful to reduce the occurrence of such "bad" events. Moreover, adjustments to vehicle systems may be beneficial where the remedial training/coaching is not yet effective to reduce the occurrences of "bad" events.

As such, there is a need in the art for systems and methods of vehicle fleet management according to automatic pedagogical behavior reinforcement and vehicle system control.

SUMMARY OF THE INVENTION

The invention relates to automated vehicle fleet management according to dynamic pedagogical behavior reinforcement. In at least some aspects, event-based data corresponding to detected events is processed to generate event data sets that include: at least video corresponding to the event and data identifying an event-type for the event. One or more pedagogical event pairs are identified, each of which includes a first event data set reflecting a "good" response to an event-type and a second event data set reflecting a "bad" response to the event-type. At least one cluster of drivers having similar occurrence rates for the event-type is identified. One or more training lessons are generated for the cluster based on the event type, which training lessons include at least the video of the first event data set and the video of the second event data set. The training lessons are administered to a driver of the cluster via a computing device. The autonomous control of one or more vehicle systems is instituted based on the administered training lessons.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

In the following description of the present invention, reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
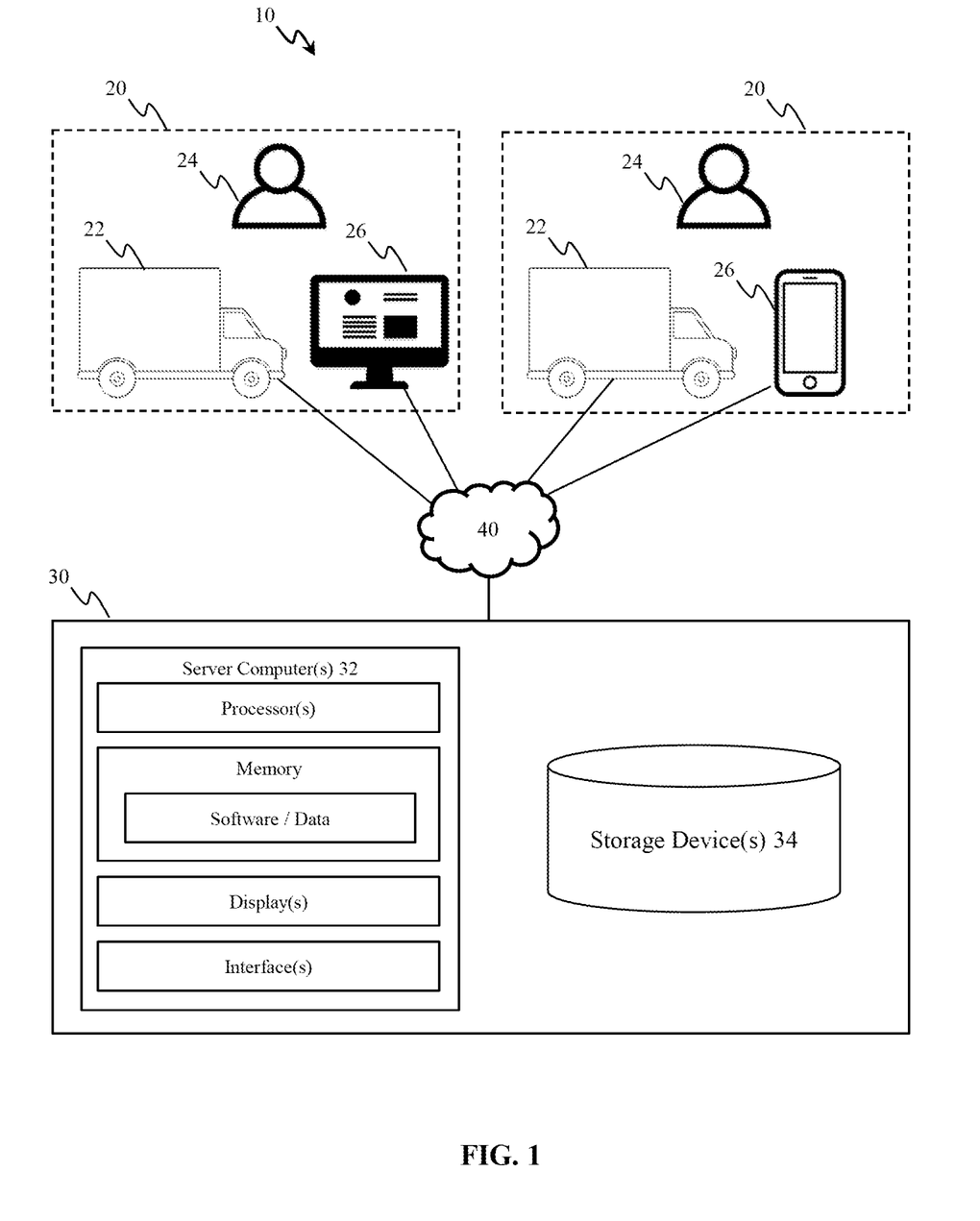
FIG. 1 is a block diagram that illustrates a fleet management system according to one or more aspects of the invention.

In at least some embodiments, the invention relates to automated vehicle fleet management according to dynamic pedagogical behavior reinforcement. Referring to FIG. 1, by way of overview, a schematic block diagram is provided illustrating details of a fleet management system 10 adapted for vehicle fleet management according to automatic pedagogical behavior reinforcement and vehicle control.

In general, the fleet management system 10 includes a plurality of fleet vehicles 22 and assigned fleet drivers 24 tasked with driving the fleet vehicles 22 (e.g., commercial trucks for transporting goods). Each fleet vehicle 22 may be equipped with and/or interact with one or more components of an event detection and reporting system 100 configured to collect and report event-based data corresponding to driver and/or vehicle related events occurring during and/or outside of a driving excursion. Exemplary event detection and reporting systems include the system known as Safety-Direct® provided by Bendix Commercial Vehicle Systems.

The fleet management system 10 also includes a back-end system 30, communicatively coupled to each of the vehicles 22 and to one or more driver computing devices 26, via a network 40. The association between fleet drivers, driver computing devices and fleet vehicles is represented in FIG. 1 by groupings 20. It will be understood, however, that the combinations of specific drivers, driver computing devices, and vehicles is variable, such that drivers can drive different vehicles, use different driver computing devices, and that more than one driver can drive the same vehicle (e.g., as a driving team) and/or share driver computing devices.

The network 40 may be, in part or in whole, any type of network (e.g., wired and/or wireless) configured to facilitate the communication and transmission of data, instructions, etc. from one component to another component of the network. For example, the network may include a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network. The network 40 is preferably a wireless network wirelessly coupling the back-end system to each of the fleet vehicles and to the driver computing devices.

The back-end system 30 may generally be a server system configured to process the event-based data and to provide automatic pedagogical behavior reinforcement and vehicle control according to one or more of the embodiments described herein. The back-end system 30 may accordingly comprise one or more server computers 32, each including components typically associated with computers, such as one or more processors, physical memories, software instructions, data, displays, and interfaces.

The processor of the server computer 32 may instruct the components thereof to perform various tasks based on the processing of information and/or data that may have been previously stored or have been received, such as instructions and/or data stored in the memory and/or the storage devices. The processors may be standard processors, such as a central processing unit (CPU), or may be dedicated processors, such as an application-specific integrated circuit (ASIC) or a field programmable gate array (FPGA).

The memory stores at least instructions and/or data that can be accessed by the processor. For example, the memory may be hardware capable of storing information accessible by the processor, such as a ROM, RAM, hard-drive, CD-ROM, DVD, write-capable, read-only, etc. The set of instructions may be included in software that can be implemented on the server computer. It should be noted that the terms "instructions," "steps," "algorithm," and "programs" may be used interchangeably. Data can be retrieved, manipulated or stored by the processor in accordance with the set of instructions or other sets of executable instructions. The data may be stored as a collection of data.

The server computer 32 accordingly may include one or more software applications, stored in the memory, which software applications, when executed by the processor configures the server computer to function in accordance with one or more embodiments described herein. The server computer 32 may be configured to host and/or otherwise support an online platform (i.e., the website) accessible by the driver computing devices 26, so as to send and/or receive data to and from the server computer 32. The software may further configure the server computer 32 to allow the driver computing devices 26 to interact with the online platform as described herein.

The display may be any type of device capable of communicating data to users, such as a liquid-crystal display ("LCD") screen, a plasma screen, etc. The interface allows users to communicate with the server computer and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The back-end system 30 may also include one or more storage devices 34 configured to store large quantities of data and/or information, and may further include one or more databases. For example, the storage device 34 may be a collection of storage components, or a mixed collection of storage components, such as ROM, RAM, hard-drives, solid-state drives, removable drives, network storage, virtual memory, cache, registers, etc. The storage device 34 may also be configured so that the server computers 32 may access it in furtherance of executing the functions of the beck-end system 30 described herein. In some embodiments, the storage of the data may be in accordance with one or more database management systems implemented by the back-end system 30.

The driver computing devices 26 are generally computing devices of the fleet drivers 24, and may include mobile (e.g., laptop computer, tablet computer, smartphone, PDA, wearable, etc.) or stationary (e.g., desktop computer, etc.), multi-purpose or dedicated, devices configured to communicate data and information with the back-end system via the network through the online platform. The driver computing devices 36 may include components typically associated with such devices, such as one or more processors, physical memories, software instructions, data, displays, and interfaces, as is known in the art. In at least some embodiments, the driver computing devices 26 may be installed as an on-vehicle device.

In certain embodiments, the invention may be implemented, at least partially, by the on-vehicle event detection and reporting system 100, which may include sensor systems that capture event data from which events involving the vehicle are determined. The sensor system may include one or more cameras that capture videos of a driver's seat area and other areas—which videos may be used for pedagogical behavior reinforcement.

The event detection and reporting system 100 may accordingly be configured to collect, analyze and communicate event data, including video and non-video event data, corresponding to a detected driver and/or vehicle related event occurring at a particular point in time during a driving excursion. Such event data can include data collected from components of, or components interacting with, the event detection and reporting system.

From the event data, the event detection and reporting system can detect, in real time, driver and/or vehicle-related events (hereinafter "events") that happen over the course of a driving excursion, or even outside of the driving excursion. The events and/or the event data can be recorded, stored, reported to, collected by, or otherwise communicated internally and/or externally by the event detection and reporting system, as discussed further herein. Accordingly, the event data can include data from which events can be detected. It will be appreciated, however, that the event data can also can include data that corresponds to the detected event but is not used to detect the event (e.g., driver facing camera captured image data corresponding in time to a lane departure event detected via LDW system data, etc.).

Examples of events that may be detected, reported to and/or collected by the event detection and reporting system in real time include: safety events, for example and without limitation, excessive acceleration, excessive braking, exceeding speed limit, excessive curve speed, excessive lane departure, lane change without turn signal, loss of video tracking, LDW system warning, following distance alert, forward collision warning, collision mitigation braking, collision occurrence, etc., and non-safety events, for example and without limitation, the driver logging in/out of a vehicle telematics system, the driver/passenger entering/leaving the vehicle, the driver/passenger occupying/vacating the bunk area, the driver occupying/vacating the driver seat, the vehicle engine being on/off, the vehicle gear being in park/drive, the parking brake being on/off, etc. Non-safety events may also include theft events, for example and without limitation, the presence of an unauthorized occupant accessing the vehicle, etc.

The event detection and reporting system 100 may use data collected directly from vehicle components (e.g., devices, sensors, or systems), and data collected from an analysis of image and/or video data, to generate event datasets that correspond in time with one or more detected events. For example, non-video event data, generated in connection with a detected event determined from processing captured non-video event data, may be associated with captured video frames whose timeline spans or overlaps the time when the non-video event data was detected/collected. Video event data, generated in connection with a detected event determined from processing of captured vehicle video frames, may at least be associated with the captured video frames from which it was generated. The video event data may also be associated with other captured video frames whose timelines span or overlap the time when the event was detected/collected. In these scenarios, the time may be calculated based on the video frame or frames from which the event object was derived. The video event data may, additionally or alternatively, be associated with non-video event data whose timelines span or overlap the time when the event was detected/collected.

One or more records of the detected events and/or the event data sets generated for the detected events may be stored in association with individual and/or teams of drivers logged into the vehicle telematics system during the occurrence of the event, or otherwise during a timespan associated with the event. For example, the one or more records can be associated with the most recent driver(s) logged into the vehicle telematics system prior to the occurrence of an event. In particular, the one or more records of events and/or data sets may be associated with driver identification data of the driver(s) in accordance with the driver(s) log in history. In other words, the driver(s) logged into the vehicle telematics system at the time of the detected event (or during the associated timespan) may be associated with the record of the event and/or event data sets generated for the event. Accordingly, events may be detected, recorded and reported as being associated with the appropriate driver(s) based at least partially on the driver identification data used to log into the vehicle telematics system.

Figure 2A:
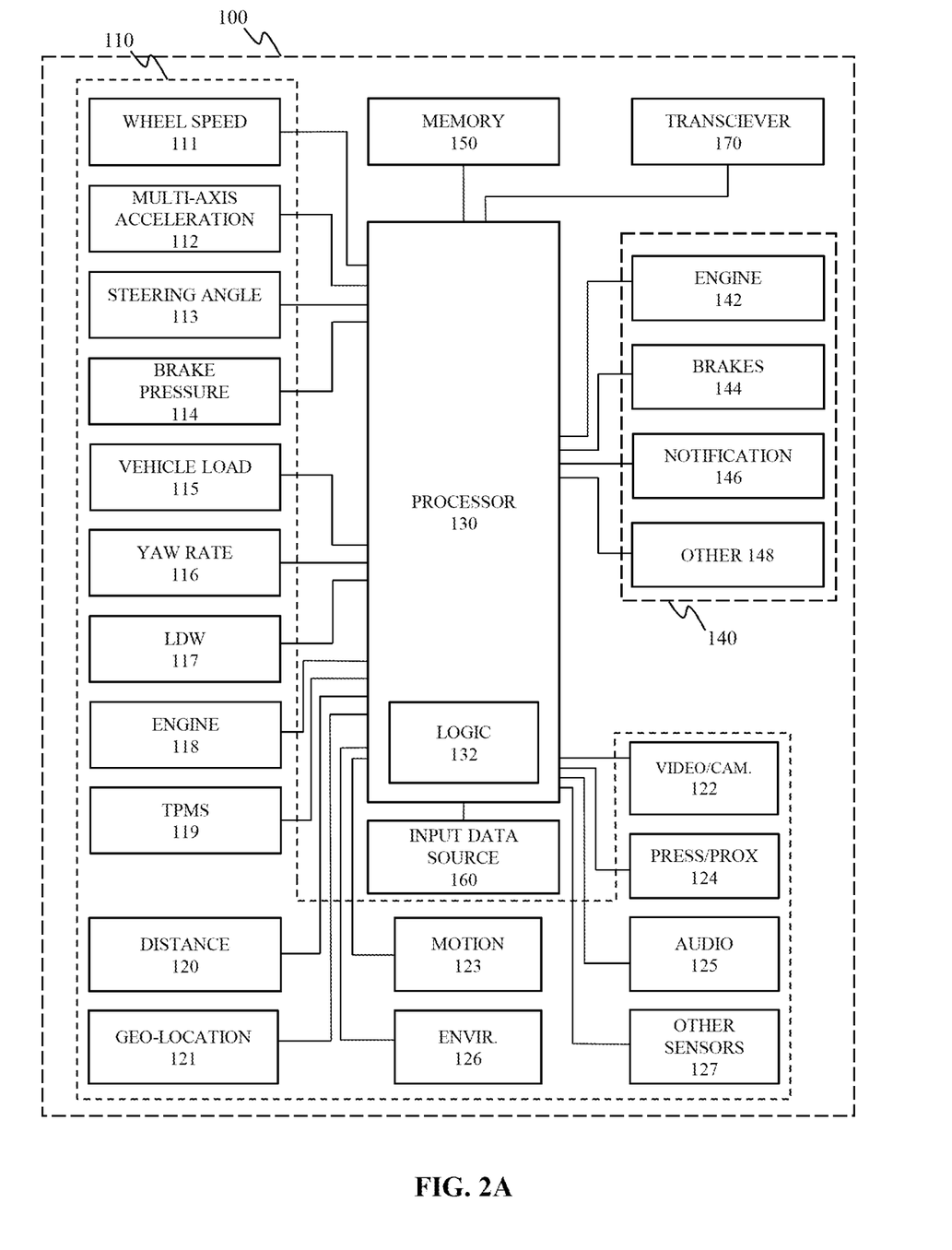
FIG. 2A is a schematic diagram of an event detection and reporting system according to one or more embodiments.

Turning now to FIG. 2A, which illustrates, by way of overview a schematic block diagram, aspects of the event detection and reporting system 100 configured to be used in accordance with one or more embodiments. The event detection and reporting system may be adapted to detect a variety of operational parameters and conditions of the vehicle and the driver's interaction therewith (i.e., event-based data, etc.) and, based thereon, to determine if a driving and/or vehicle event has occurred (e.g., if one or more operational parameter/condition thresholds has been exceeded). The data related to detected events (i.e., event-based data or data sets) may then be stored and/or transmitted to a remote location/device (e.g., backend server, dispatch center computer, mobile device, etc.), and one or more vehicle systems can be controlled based thereon.

The event detection and reporting system 100 may include one or more devices or systems 110 for providing vehicle and/or driver related data, including the event-based data indicative of one or more operating parameters or one or more conditions of a commercial vehicle, its surroundings and/or its cabin occupants. The event detection and reporting system 100 may, alternatively or additionally, include a signal interface for receiving signals from the one or more devices or systems 110, which may be configured separate from system 100. For example, the devices 110 may be one or more sensors, such as but not limited to, one or more wheel speed sensors 111, one or more acceleration sensors such as multi-axis acceleration sensors 112, a steering angle sensor 113, a brake pressure sensor 114, one or more vehicle load sensors 115, a yaw rate sensor 116, a lane departure warning (LDW) sensor or system 117, one or more engine speed or condition sensors 118, and a tire pressure (TPMS) monitoring system 119. The event detection and reporting system 100 may also utilize additional devices or sensors, including for example a forward/lateral/rear distance sensor 120 (e.g., radar, lidar, etc.) and/or a geo-location sensor 121. Additional sensors for capturing driver related data may include one or more video sensors 122 and/or motion sensors 123, pressure or proximity sensors 124 located in one or more seats and/or driver controls (e.g., steering wheel, pedals, etc.), audio sensors 125, or other sensors configured to capture driver related data. The event detection and reporting system 100 may also utilize environmental sensors 126 for detecting circumstances related to the environment of the driving excursion, including for example, weather, road conditions, time of day, traffic conditions, etc. (i.e., environment-based data). Other sensors 127, actuators and/or devices or combinations thereof may be used or otherwise provided as well, and one or more devices or sensors may be combined into a single unit as may be necessary and/or desired.

The event detection and reporting system 100 may also include a logic applying arrangement such as a controller or processor 130 and control logic 132, in communication with the one or more devices or systems. The processor 130 may include one or more inputs for receiving data from the devices or systems. The processor 130 may be adapted to process the data and compare the raw or processed data to one or more stored threshold values or desired averages or value ranges, or to process the data and compare the raw or processed data to one or more circumstance-dependent desired value, so as to detect one or more driver and/or vehicle related events.

The processor 130 may also include one or more outputs for delivering a control signal to one or more vehicle control systems 140 based on the detection of the event(s) and/or in response to vehicle and/or driver related data. The control signal may instruct the systems 140 to provide one or more types of driver assistance warnings (e.g., warnings relating to braking, obstacle avoidance, etc.) and/or to intervene in the operation of the vehicle to initiate corrective action. For example, the processor 130 may generate and send the control signal to an engine electronic control unit 142 or an actuating device to reduce the engine throttle and slow the vehicle down. Further, the processor 130 may send the control signal to one or more vehicle brake systems 144 to selectively engage the brakes (e.g., a differential braking operation). A variety of corrective actions may be possible and multiple corrective actions may be initiated at the same time. Such corrective actions need not be contemporaneous with detected events and/or event data, and may, additionally or alternatively, be responsive to one or more historical records of detected events and/or event data.

The vehicle control components may include brake light(s) and other notification devices 146, which may be configured to provide warnings and/or notifications externally to the vehicle surroundings and/or internally to the vehicle occupants. Example warnings and/or notifications include: headway time/safe following distance warnings, lane departure warnings, warnings relating to braking and or obstacle avoidance events, and any other type of warning or notification in furtherance of the embodiments described herein. Other vehicle control systems 148 may also be controlled in response to detected events and/or event data.

The event detection and reporting system 100 may also include a memory portion 150 for storing and accessing system information, such as for example the system control logic 132. The memory portion 150, however, may be separate from the processor 130. The sensors 110, controls 140 and/or processor 130 may be part of a preexisting system or use components of a preexisting system.

The event detection and reporting system 100 may also include a source of vehicle-related input data 160, which may be indicative of a configuration/condition of the commercial vehicle and/or its environmental circumstances (e.g., road conditions, geographic area conditions, etc.). The processor 130 may sense or estimate the configuration/condition and/or the environmental circumstances of the vehicle based on the input data, and may select a control tuning or control sensitivity setting based on the vehicle configuration/condition and/or environmental circumstances. The processor 130 may compare the operational data received from the sensors 110 to the information provided by the control tuning.

The event detection and reporting system 100 may be operatively coupled with one or more driver facing imaging devices, shown for simplicity and ease of illustration as a single driver facing camera 122 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 100 such as a forward facing camera 122 to record images of the roadway ahead of the vehicle. Such cameras may, for instance, indicate proximity to objects, the roadway verge, etc.

In some embodiments, driver related data can be collected directly using the driver facing camera 122, such driver related data including head position, eye gaze, hand position, postural attitude and location, or the like, within the vehicle. In addition, driver identity and/or presence can be determined based on facial recognition technology, body/posture template matching, and/or any other technology or methodology for making such determinations by analyzing video data.

In operation, the cameras may record video data on a continuous basis, or in response to a detected event. Such data may comprise a sequence of video frames with separate but associated sensor data that has been collected from one or more on-vehicle sensors or devices, as detailed herein.

The event detection and reporting system 100 may also include a transmitter/receiver (transceiver) module 170 such as, for example, a radio frequency (RF) transmitter including one or more antennas for wireless communication of data and control signals, including control requests, event-based data, vehicle configuration/condition data, or the like, between the vehicle and one or more remote locations/devices, such as, for example, backend servers, dispatch center computers, and mobile devices, having a corresponding receiver and antenna. The transmitter/receiver (transceiver) module 170 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 may be operative to select and combine signals from the sensor systems into event-based data representative of higher-level vehicle and/or driver related data. For example, data from the multi-axis acceleration sensors 112 may be combined with the data from the steering angle sensor 113 to determine excessive curve speed event data. Other hybrid data relatable to the vehicle and/or driver and obtainable from combining one or more selected raw data items from the sensors includes, for example and without limitation, excessive braking event data, excessive curve speed event data, lane departure warning event data, excessive lane departure event data, lane change without turn signal event data, lane change without mirror usage data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, following distance event data, fuel consumption event data, ACC usage event data, and late speed adaptation (such as that given by signage or exiting). Still other hybrid data relatable to the vehicle and/or driver and obtainable from combining one or more selected raw data items from the sensors includes, for example and without limitation, driver out of position event data, passenger out of position event data, driver distracted event data, driver drowsy event data, driver hand(s) not on wheel event data, passenger detected event data, wrong driver event data, seatbelt not fastened event data, driver cellphone use event data, distracting passenger event data, mirror non-use event data, unsatisfactory equipment use event, driver smoking event data, passenger smoking event data, insufficient event response event data, insufficient forward attention event data. The aforementioned events are illustrative of the wide range of events and event-types that can be monitored for and detected by the event detection and reporting system 100, and should not be understood as limiting in any way.

The event detection and reporting system 100 may further include a bus or other communication mechanism for communicating information, coupled with the processor 130 for processing information. The system may also include a main memory 150, such as random access memory (RAM) or other dynamic storage device for storing instructions and/or loaded portions of a trained neural network to be executed by the processor 130, as well as a read only memory (ROM) or other static storage device for storing other static information and instructions for the processor 130. Other storage devices may also suitably be provided for storing information and instructions as necessary or desired.

In at least some embodiments, the event detection and reporting system 100 may be configured to execute one or more software systems or modules that perform or otherwise cause the performance of one or more features and aspects described herein. Computer executable instructions may therefore be read into the main memory 150 from another computer-readable medium, such as another storage device, or via the transceiver 170. Execution of the instructions contained in main memory 150 may cause the processor 130 to perform one or more of the functions described herein. In some embodiments, hard-wired circuitry may be used in place of or in combination with software instructions to implement the invention.

Figure 2B:
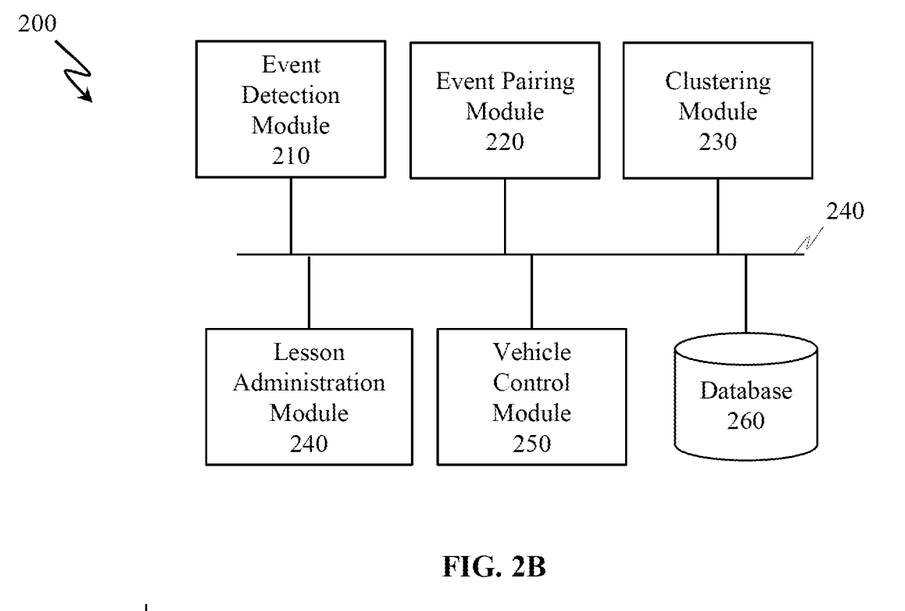
FIG. 2B is a schematic diagram of an exemplary system architecture according to one or more embodiments.

FIG. 2B schematically illustrates an exemplary system architecture 200 of the fleet management system 10, which may be generally configured for vehicle fleet management in accordance with at least one embodiment. The system architecture 200 may be implemented via one or more components of the event detection and reporting system 100, as described with respect to FIG. 2A.

As shown in FIG. 2B, the system architecture 200 may comprise one or more functional modules, including: an event detection module 210, an event pairing module 220, a clustering module 230, a lesson administration module 240, and a vehicle control module 250. The functional modules may be embodied, in whole or in part, by one or more processors (e.g., of the back-end system), alone or in combination with other system components, executing one or more software applications so as to configure the processors to implement the described functions, or otherwise cause the implementation of such functions via other system components. The functional modules may further be embodied on-vehicle and/or off-vehicle (e.g., at the remote server system), in part or in whole.

The system architecture 200 may further include a database 260 configured to store and otherwise manage the data and information discussed herein and the relationships therebetween, in furtherance of the functions described herein.

The functional modules and the database may be communicatively coupled by a network 270 configured to communicate data and information between and among the network components. The network 270 may be any combination of wired, wireless, on-vehicle and off-vehicle networks, as is known in the art.

The event detection module 210 may be configured to collect event-based data, including video data and pre/post event data ("PPE") data, and to process the event-based data so as to detect driver and/or vehicle related events therefrom.

The event-based data reflects operational parameters and conditions of the vehicle and/or the driver's interaction therewith, from which it is determinable whether a driving and/or vehicle event has occurred (e.g., if one or more operational parameter/condition thresholds has been exceeded). Examples of driver and/or vehicle related events that may be detected include but are not limited to: excessive braking events, excessive curve speed events, lane departure warning events, excessive lane departure events, lane change without turn signal events, lane change without mirror usage events, loss of video tracking events, LDW system disabled events, distance alert events, forward collision warning events, haptic warning events, collision mitigation braking events, ATC events, ESC events, RSC events, ABS events, TPMS events, engine system events, following distance events, fuel consumption events, ACC usage events, and late speed adaptation events (such as that given by signage or exiting). Still other hybrid events relatable to the vehicle and/or driver and obtainable from combining one or more event-data items includes, for example and without limitation, driver out of position events, passenger out of position events, driver distracted events, driver drowsy events, driver hand(s) not on wheel events, passenger detected events, wrong driver events, seatbelt not fastened events, driver cellphone use events, distracting passenger events, mirror non-use events, unsatisfactory equipment uses, driver smoking events, passenger smoking events, insufficient event response events, insufficient forward attention events. The aforementioned events are illustrative of the wide range of events that can be detected, and should not be understood as limiting in any way.

The event-based data may also include data from which event attributes can be determined. The event attributes may characterize circumstances of detected driver and/or vehicle related events, including circumstances up to, during and/or following the detected event. The event attributes may also characterize driver and/or vehicle behavior up to, during and/or following the detected event. Examples of event attributes include, but are not limited to: day/night, system status, DTCs present, active warnings, weather, traffic conditions, and any other operational parameters and conditions of the vehicle and/or the driver's interaction therewith that characterizes the driver and/or vehicle related events. The event-based data also includes pre-/post-event data ("PPE data") corresponding to the time periods preceding and/or following the event. For example, the PPE data may span from $t_1$ seconds before the event up to the event, and from the event up to $t_2$ seconds after the event. The PPE data reflects operational parameters and conditions of the vehicle and/or the driver's interaction therewith leading up to and following the detected event. The event-based data may be collected directly from the vehicle devices, sensors, and/or systems discussed herein at least with respect to FIG. 2A.

One or more event data sets may be generated, each of which may correspond in time with one or more detected events. The event data set generated for a detected event may include captured video frames (i.e., video data) whose timeline spans or overlaps the time when the event was detected/collected. The video frames may capture driver behavior before, during and after the detected event. The event data sets may indeed comprise video files in whose metadata other event-based data of the detected event is stored. The event data sets may also include event-based data indicating at least the event-type of the detected event. The event-based data may also include one or more of the event attributes of the detected event. Either or both of the event-type and the event attributes of the detected event may be part of the event data set for the detected event.

The event pairing module 220 may be configured to process the event data sets so as to identify pedagogical event pairs. Each pedagogical event pair includes a first event data set whose event-based data (e.g., video data) reflects a desirable or "good" driver response to an event-type, and a second event data set whose event-based data (e.g., video data) reflects an undesirable or "bad" driver response to the event-type. Each pedagogical event pair thus pairs the good driver response with the bad driver response for the event-type.

In operation, the event pairing module 220 may group the event data sets according to the event-type of the respective detected events. For example, event data sets corresponding to excessive speed events may be grouped together, whereas event data sets corresponding to excessive braking events may be grouped together. The event-type for each data set may be indicated in the event-type information of that event data set.

In some embodiments, one or more of the event data sets may include multiple event types. The grouping of event data sets may therefore be according to the multiple event-types, such that the event data sets may be grouped according to multiple single event-type groups, where each single event-type group corresponds to a single event-type. For example, an excessive speed event-type group consists of event data sets where the event-type information indicates that excessive speed is the detected event. Alternatively, or additionally, the event data sets may be grouped according to at least one multiple event-type group, where each multiple event-type group corresponds to multiple event-types. For example, an excessive speed and excessive braking event-type group consists of event data sets where the event-type information indicates that excessive speed and excessive braking is the detected event.

It will be understood that each event data set can belong to more than one event-type group for each event-type. For example, where the event data set indicates the detected event is excessive speed and excessive braking, the event data set can be grouped in both the multiple event-type group: excessive speed and excessive braking, as well as the single event type group: excessive speed, and the single event-type group: excessive braking.

For each event-type group, the event pairing module 220 may evaluate the event data sets of the event type group so as to determine which of the event data sets in the event-type group to identify as the pedagogical event pair(s) for that event type. An objective of the pedagogical pairing is to pair clearly good driver responses with clearly bad driver responses resulting from sufficiently similar events.

To this end, the time period leading up to the event may be considered for sufficient similarity between event data sets. In some embodiments, a similarity metric may be determined for potential pedagogical event pairs. The similarity metric may characterize the similarity between event attributes in a pre-event time period leading up to the events reflected therein. The pre-event time period can be any pedagogically relevant time period, but preferably from around 10 seconds before the event to around 2 seconds before the event.

In at least some embodiments, the similarity metric may be determined via processing the event-based data of the event data sets according to the following formula:

$$S_{\alpha,b} = \Sigma_{t=0}^{t=T}(|X_\alpha(t)-X_b(t)|^n * |\Delta Y_\alpha(t)-Y_b(t)|^m),$$

where $S_{\alpha,b}$ is the similarity metric between event data sets $\alpha$ and b; $X_\alpha(t)$ is the value of event attribute X for event data set $\alpha$ at time t; $X_b(t)$ is the value of event attribute X for event data set b at time t; $Y_\alpha(t)$ is the value of event attribute Y for event data set $\alpha$ at time t; $Y_b(t)$ is the value of event attribute Y for event data set b at time t; m and n are relative weights given to the respective event attributes; and t: $0 \rightarrow T$ is the pre-event time period.

In general, the lower the value for the determined similarity metric, the more similar the event data sets are. In some embodiments, a predetermined similarity threshold can be set below which the similarity metric indicates the event data sets reflect sufficient similar events. The similarity threshold can be based on the event attributes considered—and can be different for different combinations of event attributes considered. The pedagogical event pairs may be identified as those event data sets with similarity metrics below the predetermined similarity threshold (i.e. with a sufficiently small sum of differences).

For example, the following chart considers the event attributes of: vehicle speed and forward distance, for a hypothetical pair of event data sets, where the event attributes are equally weighted.

| | a | | b | |
|---|---|---|---|---|
| t (s) | X = speed (km/h) | Y = forward distance (m) | X = speed (km/h) | Y = forward distance (m) |
| −4 | 90 | 25 | 92 | 27 |
| −3 | 88 | 20 | 89 | 23 |
| −2 | 86 | 17 | 84 | 19 |

The similarity metric value of 11, in this hypothetical, would indicate that, for both event data sets, the vehicle approached an upcoming object in approximately the same way (i.e., with similar speeds and distances, as well as rates of change thereof) over the pre-event time period. This means that the prelude to both events is similar, but that the responses—after the similar preludes—may differ. It will be understood that types of differences may be weighted differently. For example, speed differences may be weighted differently than distance differences. Certain measures, especially attribute ones, may be heavily weighted, so that e.g. day and night events, even with very similar dynamic preludes, may have large similarity (i.e. indicating substantial differences) values.

It will be understood that the similarity metric calculation may consider additional event attributes, and that the formula shown above is provided to illustrate the principle of calculating the similarly metric. For example, the similarity metric may consider one or of the following event attributes: day/night, system status, DTCs present, active warnings, weather, traffic conditions, and any other PPE data leading up to the event. It will further be understood that the event data sets compared for similarity correspond to those event data sets that have been grouped according to event-type. In other words, the similarity metric checks for substantial similarity among event data sets with common event-types.

The evaluation of each event data set for pedagogical event pairs may further include processing the event-based data thereof so as to determine a driver response to the event-type of that event data set. The driver response may be determined from event-based data reflecting driver and/or vehicle behavior during the event and/or following the event, in whole or in part.

In at least some embodiments, each driver response may be evaluated so as to determine a response score characterizing how good/bad the driver response is. The response score may be one of a range of possible response scores. For example, response scores can range from values of 0 to 1, where response scores trending to 0 characterize clearly bad driver responses while response scores trending to 1 characterize clearly good driver responses and those response scores nearer to 0.5 characterize driver responses that are neither clearly good nor clearly bad driver responses.

The event pairing module 220 may identify one or more pedagogical event pairs for each event-type group based on the response scores of the event data sets of the respective event-type groups. In particular, the pedagogical event pairs may be identified as those event data sets with sufficient pedagogical dichotomy between the first event data set and the second event data set. The sufficient pedagogical dichotomy may be satisfied where there is a minimum difference between the response score of the first event data set and the response score of the second event data set. Additionally, or alternatively, the sufficient pedagogical dichotomy may be satisfied where the response score of the first event data set exceeds a threshold good value, and the second event data set exceeds a threshold bad value.

As explained herein, the objective of the pedagogical pairing is to pair clearly good driver responses with clearly bad driver responses resulting from sufficiently similar events. Accordingly, the event pairing module 220 may be embodied, at least in part, by an artificial intelligence comprising a trained neural network utilizing machine learning techniques to recognize and score good and bad driver responses based on the event data sets.

In this manner, the event pairing module may process input event data sets so as to generate and output the pedagogical event pairs—i.e., paired event data sets that include at least pedagogical "do this, not this" paired video examples—for each of the event-types under a variety of similar circumstances. The pedagogical event pairs can be stored in the database and thereafter be utilized in taking one or more remedial actions, as discussed herein.

The clustering module 230 may be configured to process the event data sets so as to identify one or more clusters of drivers for whom one or more event-types are detected at similar occurrence rates. In operation, the clustering module 230 may process the event data sets of each driver so as to determine the occurrence rates for each driver and event-type. The occurrence rate of the event-type for the driver reflects the number of times that the event-type was detected for the driver over an evaluation period or mileage (e.g., number of hours, days, weeks, driving excursions, miles, etc.). For example, driver Edwards may have an excessive braking occurrence rate of 14 excessive braking events detected in the past four driving shifts.

The clustering module 230 may further identify the clusters of drivers based on their occurrence rates for one or more event-types. The clusters of drivers may be those drivers with similar occurrence rates for one or more event-types. The clustering module 230 may cluster drivers according to known clustering techniques. In some embodiments, the clustering module 230 may comprise an artificial intelligence comprising a trained neural network utilizing machine learning techniques to appropriately cluster the occurrence rate data for the drivers.

Figure 3:
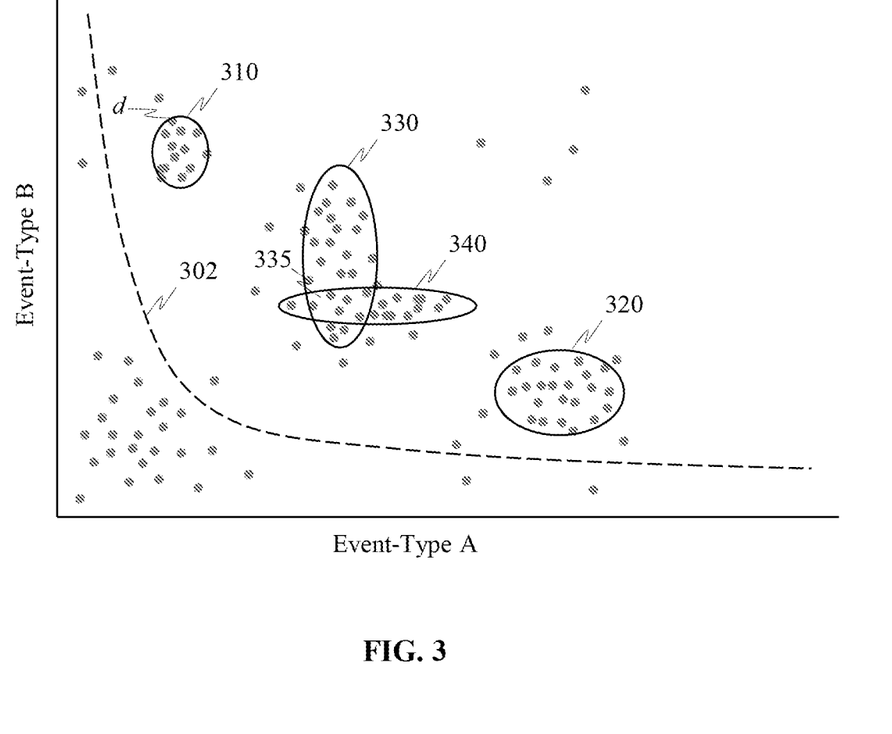
FIG. 3 is a chart illustrating aspects of one or more embodiments.

For example, FIG. 3 charts hypothetical occurrence rates of a plurality of drivers for event-types A and B. Each data point reflects the occurrence rates for event-types A and B of one of the plurality of drivers. The clusters are identifiable as denser areas of the data space (i.e., where statistical distribution samples are significantly nearer to each other relative to the rest of the data space).

A first cluster 310 reflects drivers who have similarly higher occurrence rates for event-type B, and similarly lower occurrence rates for event-type A. A second cluster 320 reflects drivers who have similarly higher occurrence rates for event-type A, and similarly lower occurrence rates for event-type B. A third cluster 330 and a fourth cluster 340 reflect drivers who have similarly mid-range occurrence rates for event-types A and B, respectively. An overlap 335 between the third and fourth clusters reflects drivers with similarly mid-range occurrence rates for both event-types A and B.

While the example of FIG. 3 illustrates a two-dimensional event-type occurrence rate data space, it will be understood that the principles described herein can be extended to an n-dimensional event-type occurrence rate data space. Moreover, the occurrence rates can be weighted in furtherance of the clustering. This may be done, for example, by assigning more weight to the distance between sample points on one axis relative to the distance between those points on another.

In some embodiments, the detected events are of a nature that clusters of higher occurrence rates reflect driving patterns common to a statistically relevant segment of the fleet drivers for which driving behavior correction is desirable. One or more remedial actions may therefore be taken, as discussed herein, based on the clustering. To this end, the clustering module 230 may further identify which clusters of drivers, from among the identified clusters, for whom remedial action is to be taken (i.e., remedial clusters). The clusters lying above a predefined remedial threshold 302 may be identified as remedial clusters, such that the remedial threshold 302 is a threshold of acceptable versus unacceptable occurrence rates. The remedial threshold 302 may be predetermined for each event-type and/or as an n-dimensional threshold.

The clustering module 230 may further characterize each cluster in terms of its event attributes, so as to identify event attribute sub-clusters for the drivers within the cluster. The event attribute sub-clusters reflect common event attributes associated with the event-type as among the cluster of drivers.

In operation, the event data sets of the drivers within the cluster may be further processed to determine the event attributes commonly associated with the detected event-type by those drivers having high occurrence rates for those event-types. For example, the first cluster 310 may identify drivers with high occurrence rates for excessive braking as the event-type. The event data sets corresponding to detected excessive braking events for those drivers in the first cluster 310 can be processed to extract one or more event attributes (e.g., time of day, vehicle speed, etc.) associated with each of those detected excessive braking events.

The extracted event attributes can then be statistically analyzed to identify the event attribute sub-clusters. For example, it may be determined that many of the excessive braking events for the cluster drivers occur during certain times of the day and within certain vehicle speed ranges. One or more remedial actions may be taken, as discussed herein, based on the identification of event attribute sub-clusters. In at least one embodiment, the clustering module 230 may identify the event attribute sub-clusters only for high-mileage drivers within the cluster.

In this manner, the clustering module 230 may process input event data sets so as to output generated driver clusters grouping drivers with pedagogically significant occurrence rates for given event-types (i.e., the clustered drivers all have unacceptable occurrence rates of event-type E for which correction is desirable), as well as driver sub-clusters further grouping such drivers according to respective event attributes (i.e., the sub-clustered drivers all have unacceptable occurrence rates of event-type E with F event attributes for which correction is desirable).

The lesson administration module 240 may be configured to match the pedagogical event pairs with identified clusters according to pedagogical utility, and to generate one or more cluster training lessons therefrom, which cluster training lessons include at least the component dichotomic videos of the pedagogical event pairs as "do this, not this" examples.

Accordingly, the pedagogical event pairs may be matched with clusters according to the usefulness of the component dichotomic video pairs in correcting the undesirable event-type occurrence rates indicated by the clusters. The pedagogical utility of the dichotomic video pairs can be determined by matching according to event-type. The matching may also be according to event attributes.

For example, the following table illustrates a hypothetical example with pedagogical event pairs $P_1$, $P_2$ and $P_3$, and clusters $C_1$ and $C_2$. The matched event-types indicate that cluster $C_1$ would likely benefit from cluster training lessons that include the dichotomic video pair of pedagogical event pair $P_1$. Similarly, cluster $C_2$ would likely benefit from cluster training lessons that include the dichotomic video pair of pedagogical event pair $P_2$. Accordingly, the lesson administration module 240 would match pedagogical event pair $P_1$ with cluster $C_1$, and pedagogical event pair $P_2$ with cluster $C_2$.

|  | $P_1$ | $P_2$ | $P_3$ | $C_1$ | $C_2$ | $C_3$ |
| --- | --- | --- | --- | --- | --- | --- |
| event-type(s) | excessive curve speed + excessive braking | lane departure warning | excessive braking | excessive curve speed + excessive braking | lane departure warning | excessive braking |
| event attribute(s) | approaching highway exit + night | unchecked blind spot | day | approaching highway exit + night | unchecked blind spot | day |

Some pedagogical event pairs may be matched to more than one cluster. For example, both of clusters $C_1$ and $C_3$ may benefit from cluster training lessons that include the dichotomic videos of pedagogical event pair $P_3$. Accordingly, the lesson administration module 240 may also match pedagogical event pair $P_3$ with both clusters $C_1$ and $C_3$. By the same token, some clusters may be matched to more than one pedagogical event pair. For example, the cluster $C_1$ may benefit from cluster training lessons that include the dichotomic videos of both pedagogical event pairs $P_1$ and $P_3$. Accordingly, the lesson administration module 240 may match both pedagogical event pairs $P_1$ and $P_3$ with cluster $C_1$.

The pedagogical event pairs can also be similarly matched to event attribute sub-clusters based on the event attributes. In that case, the matched event attributes indicate that the cluster $C_3$ may benefit from cluster training lessons that include the dichotomic videos of pedagogical event pair $P_3$, but may not benefit as much or at all from the dichotomic videos of pedagogical event pair $P_1$.

Accordingly, each cluster training lesson may be generated to include at least one dichotomic video pair that serves as a "do this, not this" example for the event-type of the matched cluster.

In some embodiments, the cluster training lessons may be generated for clusters of drivers associated with multiple event-types. For example, in FIG. 3, the first cluster 310 reflects drivers who have similarly higher occurrence rates for event-type B, and similarly lower occurrence rates for event-type A. One or more cluster training lessons for such clusters would therefore be generated to include dichotomic video pairs for event-type A and for event-type B.

The lesson administration module 240 may accordingly calculate a ratio of such dichotomic video pairs of each event-type to include in the cluster training lesson. A weighted-ratio based calculation may be used to determine the ratio of dichotomic video pairs of each event-type. The weighted-ratio calculation may be according to the following formula:

$$R_A = \frac{K_A * J_A}{(K_A * J_A) + (K_B * J_B)} \text{ and } R_B = \frac{K_B * J_B}{(K_A * J_A) + (K_B * J_B)},$$

where $R_A$ is the weighted ratio for event-type A, $R_B$ is the weighted ratio for event-type B, K is an importance factor, and J is an occurrence rate factor.

The importance factor may be such that that $K_A$ reflects the relative importance of event-type A, and $K_B$ reflects the relative importance of event-type B. The importance factor may reflect the need for more/less correction where the event-type is more/less critical. The importance factor may be predetermined for one or more event-types. The occurrence rate factor may be such that $J_A$ reflects the relative need for more/less correction due to the higher/lower occurrence rates for event-type A, whereas $J_B$ reflects the relative need for more/less correction due to the higher/lower occurrence rates for event-type B. The occurrence rate factor can be determined based on the amount by which the fleet median occurrence rate is exceeded by the cluster for the event-type. The occurrence rate factor may be predetermined for one or more occurrence rate ranges and event-types.

The mix of dichotomic video pairs, per event-type, for the cluster training lesson may therefore be calculated as approximately:

$$L_{A,B} = R_A V_A + R_B V_B,$$

where $V_A$ is the dichotomic video pair for event-type A, and $V_B$ is the dichotomic video pair for event-type B. For example, event-type A may be excessive curve speed while event-type B may be excessive lane departures. Excessive curve speed may also be twice as important as excessive lane departures, and the cluster may have thrice the fleet median for excessive curve speed while it has twice the fleet medium for excessive lane departures. $R_A$ would therefore be 4/7, whereas $R_B$ would be 3/7. Thus, approximately 4/7 of the dichotomic video pairs in the generated cluster training lesson should be for excessive curve speed, and 4/7 of the dichotomic video pairs in the generated cluster training lesson should be for excessive lane departures. Where the cluster training lesson includes 5 dichotomic video pairs, for example, this means that the cluster training lesson would include 3 dichotomic video pairs for excessive curve speed, and 2 for excessive lane departures.

Such weighting can also be similarly applied to determine the ratio of dichotomic video pairs of each event attribute within event-types to include in the cluster training lesson. For example, if there is an even number of day/night excessive lane departure event-types, the generated cluster training lesson for that event-type would be one dichotomic video pair reflecting the daytime event attribute, and one reflecting the nighttime event attribute.

In at least some embodiments, the lesson administration module 240 can be configured to generate individual training lessons for one or more drivers in similar fashion to the cluster training lessons, but for individual drivers rather than for clusters. In other words, the individual training lessons can be generated via similarly matching the pedagogical event pairs with individual drivers according to pedagogical utility. Moreover, individual training lessons may also be similarly generated to include dichotomic video pairs for multiple event-types.

In this manner, cluster training lessons and/or individual training lessons may be generated for each driver of the fleet. In particular, at least one cluster training lesson may be generated for drivers according to the clusters and/or sub-clusters to which they belong. This cluster training lessons act as common core training lessons for each cluster—i.e., training lessons that are reusable amongst the drivers of the cluster—and are therefore more efficiently generated and administered by the lesson administration module 240. The individual training lessons provide more individualized training where the cluster training may not be as applicable, e.g., at the edges or outside of the cluster. The individual training lessons may therefore supplement the cluster training lessons on a driver-by-driver basis. Accordingly, one or more training lesson mixes may be generated. If a driver has already seen a particular dichotomic pair, a not yet seen pair may be used instead, if desired. Organization policy regarding repetition may guide whether old dichotomic pairs can be reused.

Figure 4:
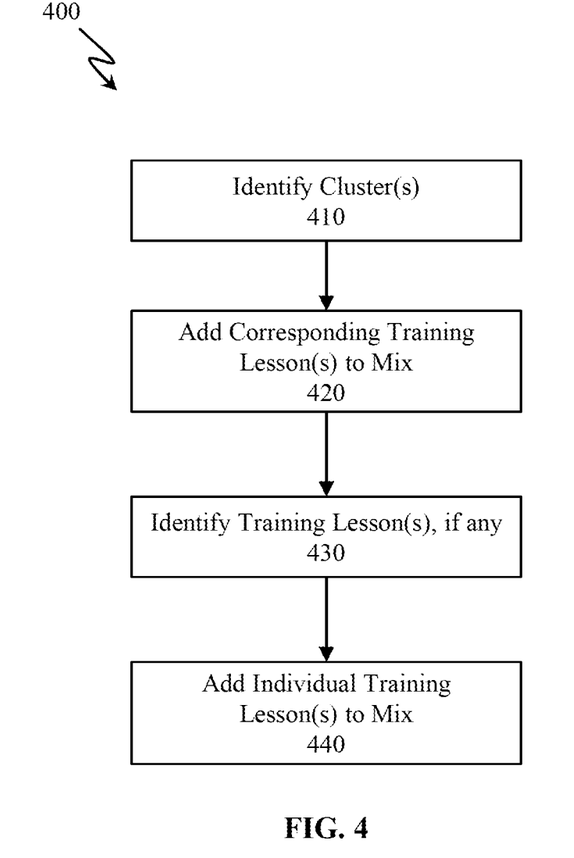
FIG. 4 is a flow-chart illustrating an exemplary process according to one or more embodiments.

FIG. 4 illustrates an exemplary process for determining a training lesson mix for at least one driver.

At step 410, one or more clusters (and/or sub-clusters) are identified to which the driver belongs. For example, the first cluster 310 (FIG. 3) reflects drivers who have similarly higher occurrence rates for event-type B, and similarly lower occurrence rates for event-type A.

At step 420, one or more of the corresponding cluster training lessons for the driver's cluster are added to the training lesson mix for that driver. For example, where event-type A is equally important as event-type B (i.e., the importance factor K for each is the same), and where event-type A and event-type B occur twice and thrice as much as the fleet median, respectively (i.e., the occurrence rate factors $J_A$ and $J_B$ are 2 and 3), the cluster training lesson that includes 2 dichotomic video pairs for event-type A and 3 dichotomic video pairs for event-type B may be added to the training lesson mix for the driver. The event attributes for the cluster can also be considered in determining which dichotomic video pairs for each event-type are to be added to the training lesson mix for the driver, as described herein.

At step 430, it is determined whether the addition of individual training lessons is warranted for the driver with respect to one or more event-types. The addition of individual training lessons may be warranted for the event-type when the occurrence rate of the driver for that event-type deviates from the cluster centroid by a predetermined amount. For example, in FIG. 3, driver d of the first cluster 310 is shown towards the outskirts of the first cluster 310—as having a higher occurrence rate for event-type A and a lower occurrence rate for event-type B than the cluster in general. Accordingly, it may be determined that driver d may benefit from additional dichotomic video pairs for event-type B.

At step 440, one or more individual training lessons may be added to the training lesson mix, in accordance with the determination of step 420. In other words, where individual training lessons are determined to be warranted, corresponding individual training lessons may be added to the training lesson mix for the driver.

It will be understood that, in either or each of steps 410 and 430, event attributes may be considered to further determine which cluster training lessons and/or individual training lessons are to be added to the training lesson mix.

Returning to FIG. 2B, the lesson administration module 240 may be configured to assign and administer the training lessons to the fleet drivers. The training lessons may be administered via the online platform interactive with the driver computing devices so as to provide the drivers with access to the assigned training lessons. The training lessons may be assigned via distinct URLs linking to the respective training lesson via the online platform. The URLs may include automatic forwarding or linking to the next lesson. As described herein, the training lessons may include one or more of the dichotomic video pairs, as "do this, not this" examples. However, the training lessons may also include further components, such as, for example, narration, text, quizzes, and other pedagogical components. Exemplary aspects of lesson administration are discussed in U.S. patent application Ser. No. 17/404,137, entitled "Automatic Teaching Device", which was filed on Aug. 17, 2021.

The lesson administration module 240 may further be configured to maintain a training profile for each fleet driver. The training profile may include a historical record of the training lessons assigned to the driver, and may track lesson completion by the driver. The training profile can therefore include information showing how the driver has progressed or not progressed as a result of one or more training lessons. For example, continued assignments of training lessons for event-type A over an extended period of time suggests that the training lessons are not improving the driver's avoidance of event-type A. Adjustments to the training lessons, job details, vehicle control, or other adjustments may be made in response.

In some embodiments, the training profile may maintain an improvement metric for the driver, with respect to each event-type for which lessons have been assigned. The improvement metric may measure driver improvement, with respect to the event-type, in response to lesson completion. The improvement metric may be calculated by:

$$I_{A,B} = \frac{K_A \Delta_A + K_B \Delta_B}{\Delta_A + \Delta_B},$$

where $K_A$ and $K_B$ are the importance factors for event-type A and event-type B, respectively, and $\Delta_A$ and $\Delta_B$ reflect the reduction in occurrence rates for event-type A and event-type B, respectively. It will be understood that the calculation may be extended for more or fewer than two event-types.

One or more lesson metrics may be derived from the training profiles of the drivers. The lesson metrics may track which drivers were assigned and completed which lessons for which event-types, and the improvement metrics for those drivers with respect to those event-types. The lesson metrics may be utilized to modify the administration of the training lessons so as to provide more effective training. In other words, the lesson metrics may be utilized as feedback in a feedback loop for adjusting the administration of the training lessons. Some exemplary aspects of the lesson administration that can be modified include, for example, the length of one or more training lessons, the number of dichotomic video pairs included in the training lesson, the sequence according to which dichotomic video pairs are presented, the frequency at which training lessons are assigned, the effectiveness of a dichotomic pair for training other drivers, this measured by the improvements they show, and the timing at which training lessons are assigned. Other aspects of lesson administration may also be modified according to the lesson metrics.

The vehicle control module 250 may be configured to control one or more vehicle systems, as described herein, based on the information contained in the training profiles of the drivers. In particular, the vehicle control module 250 may cause processor 130 to output control signals to one or more vehicle control systems 140, so as to control the one or more vehicle systems. Examples of such control include but are not limited to: providing one or more types of warnings (e.g., driver assistance system warnings, warnings to passengers in the cabin that the driver requires assistance, etc.), intervening in the operation of the vehicle (e.g., to initiate corrective action, to activate harm mitigating features, to assume autonomous control, etc.), and alerting remote locations/devices (e.g., backend servers, dispatch center computers, mobile devices, etc.) of detected events.

In some embodiments, one or more thresholds for providing warnings, intervening in the vehicle operation, and/or alerting remote locations/devices may be adjusted based on the driver training profile. For example, where the training profile indicates that the driver has been assigned a training lesson for event-type A, which has not yet been completed, the thresholds for taking corrective action in response to a detection of event-type A may be adjusted so as to take such corrective action earlier. As another example, where the improvement metric for the driver with respect to event-type B shows that the driver is not improving in the avoidance of event-type B, the thresholds for issuing warnings for event-type B may be adjusted so that the driver is warned earlier that event-type B may soon occur.

It will be understood, however, that a variety of control actions may be possible and multiple control actions may be initiated at the same time. Accordingly, in at least some embodiments, the invention relates to the control of vehicle systems based on the dynamically generated training lessons. Moreover, the vehicle system control can be cluster-based, such that similar vehicle system control is applied to the drivers common to the cluster. This allows for a common core of control signals to be provided according to the common event-type training lessons assigned to the cluster.

Figure 5:
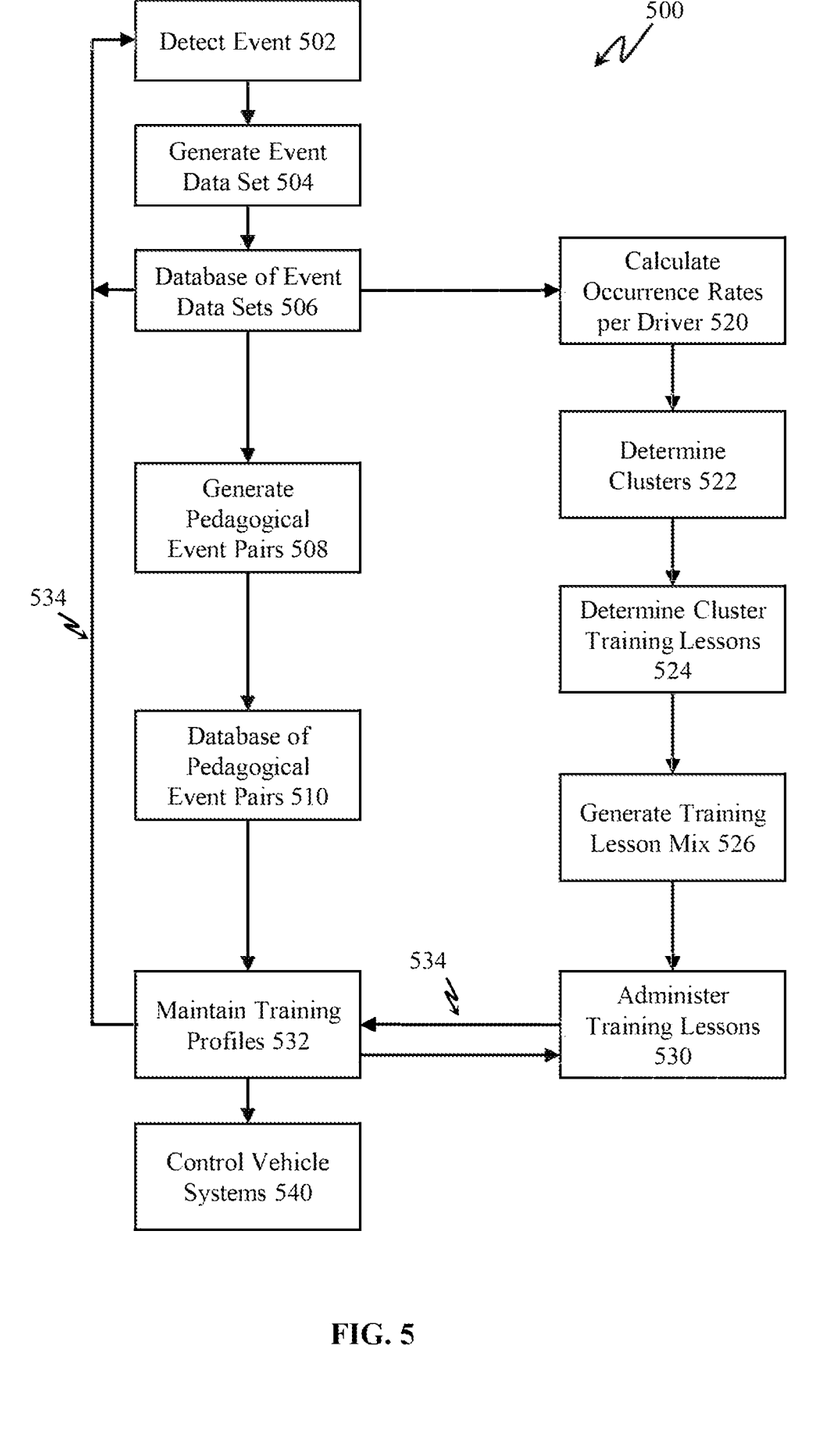
FIG. 5 is a flow-chart illustrating an exemplary process according to one or more embodiments.

FIG. 5 is a flow-chart illustrating an exemplary method 500 according to at least one embodiment.

At step 502, the event detection module 210 may collect event-based data, including video data and PPE data, and process the event-based data so as to detect driver and/or vehicle related events therefrom, as discussed herein. At step 504, an event data set may be generated, which corresponds in time with the detected event. The event data set may include captured video frames (i.e., video data) whose timeline spans or overlaps the time when the event was detected/collected. The video frames may capture driver and/or vehicle behavior before, during and after the detected event. At step 506, the event data set may be added to the database. Steps 502-506 may be repeated for a plurality of detected events, such that the database is populated with a plurality of corresponding event data sets, as discussed herein.

At step 508, the event pairing module 220 may process the event data sets stored in the database, as discussed herein, so as to identify and output one or more pedagogical event pairs—i.e., paired event data sets that include at least pedagogical "do this, not this" paired video examples—for each of the event-types under a variety of similar circumstances. The pedagogical event pairs can be stored in the database in step 510, such that the database is populated with a plurality of pedagogical event pairs.

At step 520, the clustering module 230 may process the event data sets, as discussed herein, so as to determine the occurrence rates for each driver per event-type—i.e., the number of times that the event-type was detected for the driver over the evaluation period (e.g., number of hours, days, weeks, driving excursions, etc.).

At step 522, the clustering module 230 may further identify the clusters of drivers based on their occurrence rates for one or more event-types. The clusters may group together drivers with pedagogically significant occurrence rates for given event-types (i.e., the clustered drivers all have unacceptable occurrence rates of event-type E for which correction is desirable). The clusters may further group together drivers according to similar event attributes within event-types. The clusters can be stored in the database, such that the database is populated with a plurality of clusters.

At step 524, the lesson administration module 240 may process the pedagogical event pairs and the identified clusters, as described herein, to generate one or more cluster training lessons for the cluster. In particular, the clusters may be matched to one or more pedagogical event pairs according to the usefulness of the corresponding dichotomic video pairs in reducing the corresponding event-type occurrence rates. This cluster training lesson acts as common core training lesson for the cluster—i.e., a training lesson that is reusable amongst the drivers of the cluster.

At step 526, the lesson administration module 240 may generate a lesson mix for the fleet drivers, according to at least their membership in respective one or more clusters. The lesson mix may include at least one cluster training lesson, and may also include one or more individual training lessons that supplement the cluster training lesson on a driver-by-driver basis.

At step 530, the lesson administration module 240 may assign and administer the training lessons to the appropriate fleet drivers, as described herein. The training lessons may be administered via the online platform interactive with the driver computing devices so as to provide the drivers with access to the assigned training lessons.

At step 532, the lesson administration module 240 may maintain the training profiles of each fleet driver, as described herein. The training profile may include a historical record of the training lessons assigned to the driver, and may track lesson completion by the driver. The training profiles may also include improvement metrics and lesson metrics. The training profiles, and the information therein, may be utilized, in feedback loop 534 to modify the administration of the training lessons so as to provide more effective training.

At step 540, the vehicle control module 250 may control one or more vehicle systems based on the information contained in the training profiles, as discussed herein. Examples of such control include but are not limited to: providing one or more types of warnings (e.g., driver assistance system warnings, warnings to passengers in the cabin that the driver requires assistance, etc.), intervening in the operation of the vehicle (e.g., to initiate corrective action, to activate harm mitigating features, to assume autonomous control, etc.), and alerting remote locations/devices (e.g., backend servers, dispatch center computers, mobile devices, etc.) of detected events. The vehicle system control can be cluster-based, such that similar vehicle system control is applied to the drivers common to the cluster. This allows for a common core of control signals to be provided according to the common event-type training lessons assigned to the cluster.

In at least some embodiments, the method 500 may be a continuous method, indicated by loop 536, that dynamically updates the database with additional event data sets, pedagogical event pairs, clusters, training lessons and/or lesson mixes as more events are detected. Accordingly, vehicle fleet management based on automatic pedagogical behavior reinforcement and vehicle control can be achieved.

As used herein, the terms "camera" or "cameras" are intended to refer to any and all digital imaging devices, including but not limited to cameras. Moreover, references to "driver," "passenger," and "occupant," should be understood to be interchangeable, and the principles of the invention understood to apply as appropriate to each.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described herein with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 130 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition, and further in accordance with the descriptions herein, the terms "logic" and "module," as used herein, includes hardware, firmware, software in execution on a machine, and/or combinations of each to perform a function(s) or an action(s), and/or to cause a function or action from another logic, method, and/or system. Such logic or modules may include one or more software controlled microprocessors, a discrete logic (e.g., ASIC), an analog circuit, a digital circuit, a programmed logic device, a memory device containing instructions, and so on. Such logic or modules further may include one or more gates, combinations of gates, or other circuit components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for vehicle fleet management and dynamic pedagogical behavior reinforcement, comprising:
an event detection module configured to process event-based data corresponding to detected driver and/or vehicle related events so as to generate event data sets therefrom, wherein the event data sets include at least: video corresponding to the event and data identifying an event-type for the event;
an event pairing module configured to process the event data sets so as to identify one or more pedagogical event pairs, wherein each pedagogical event pair includes a first event data set reflecting a good response to an event-type and a second event data set reflecting a bad response to the event-type;
a clustering module configured to process the event data sets so as to identify at least one cluster of drivers, wherein the cluster includes one or more drivers with respective occurrence rates for the event-type that are approximately a first occurrence rate;
a lesson administration module configured to:
generate one or more training lessons for the cluster of drivers based on the event type, wherein the one or more training lessons include at least the video of the first event data set and the video of the second event data set, and
administer the generated training lessons to a driver of the cluster of drivers via a computing device; and
a vehicle control module configured to control one or more vehicle systems based on the administered training lessons.

2. The system of claim 1, wherein the event data sets further include data identifying event attributes, and wherein the pedagogical event pair includes similar event attributes.

3. The system of claim 1, wherein the one or more training lessons include: the video of a first set of pedagogical event pairs corresponding to a first event-type, and a second set of pedagogical event pairs corresponding to a second event-type.

4. The system of claim 1, wherein the lesson administration module is further configured to generate individualized training lessons for the driver based on the driver's occurrence rates for another event-type.

5. The system of claim 1, wherein the lesson administration module is further configured to maintain a training profile for each driver, and wherein the control of the one or more vehicle systems is based on the training profile.

6. The system of claim 5, wherein the training profile includes an improvement metric for the driver with respect to the event-type.

7. The system of claim 1, wherein the control of the one or more vehicle systems includes at least one of: providing warnings, intervening in the operation of the vehicle, and alerting remote locations/devices of detected events.

8. A method for vehicle fleet management and dynamic pedagogical behavior reinforcement, comprising:
processing event-based data corresponding to detected driver and/or vehicle related events so as to generate event data sets therefrom, wherein the event data sets include at least: video corresponding to the event and data identifying an event-type for the event;
identifying, from the event data sets, one or more pedagogical event pairs, wherein each pedagogical event pair includes a first event data set reflecting a good response to an event-type and a second event data set reflecting a bad response to the event-type;
analyzing the event data sets so as to identify at least one cluster of drivers, wherein the cluster includes one or more drivers with respective occurrence rates for the event-type that are approximately a first occurrence rate;
generating one or more training lessons for the cluster of drivers based on the event type, wherein the one or more training lessons include at least the video of the first event data set and the video of the second event data set;
administering the generated training lessons to a driver of the cluster of drivers via a computing device; and
initiating automated control over one or more vehicle systems based on the administered training lessons.

9. The method of claim 1, wherein the event data sets further include data identifying event attributes, and wherein the pedagogical event pair includes similar event attributes.

10. The method of claim 1, wherein the one or more training lessons include: the video of a first set of pedagogical event pairs corresponding to a first event-type, and a second set of pedagogical event pairs corresponding to a second event-type.

11. The method of claim 1, further comprising:
generating individualized training lessons for the driver based on the driver's occurrence rates for another event-type.

12. The method of claim 1, further comprising:
maintaining a training profile for each driver, and wherein the control of the one or more vehicle systems is based on the training profile.

13. The method of claim 12, wherein the training profile includes an improvement metric for the driver with respect to the event-type.

14. The method of claim 1, wherein the control of the one or more vehicle systems includes at least one of: providing warnings, intervening in the operation of the vehicle, and alerting remote locations/devices of detected events.

* * * * *